United States Patent [19]

Manning

[11] Patent Number: 4,509,782
[45] Date of Patent: Apr. 9, 1985

[54] ENERGY ABSORBING VEHICLE BUMPER

[75] Inventor: Donald L. Manning, Orchard Lake, Mich.

[73] Assignee: Transpec, Inc., Troy, Mich.

[21] Appl. No.: 528,403

[22] Filed: Sep. 1, 1983

[51] Int. Cl.³ .............................................. B60R 19/08
[52] U.S. Cl. ................................... 293/121; 293/109; 293/126; 293/152
[58] Field of Search ........ 293/102, 109, 110, 120–122, 293/126, 139, 148, 149, 151, 152

[56] References Cited

U.S. PATENT DOCUMENTS 1,386,190  8/1921  Lyon .................................. 293/152
3,997,207  12/1976  Norlin .............................. 293/110

FOREIGN PATENT DOCUMENTS 2751077  5/1978  Fed. Rep. of Germany ...... 293/109

Primary Examiner—Robert B. Reeves
Assistant Examiner—Dennis H. Pedder
Attorney, Agent, or Firm—Reising, Ethington, Barnard, Perry & Milton

[57] ABSTRACT

The bumper system of the present invention is of a modular design wherein two substantially identical laterally extending members are secured at their laterally innermost ends to define an integrated bumper device and wherein each module includes a relatively soft and resilient material mounted in front of and upon a relatively stiff, though deflectable, transverse support beam member which is, in turn, adapted to be secured to a vehicle frame through a suitable rearwardly extending bracket structure.

13 Claims, 10 Drawing Figures

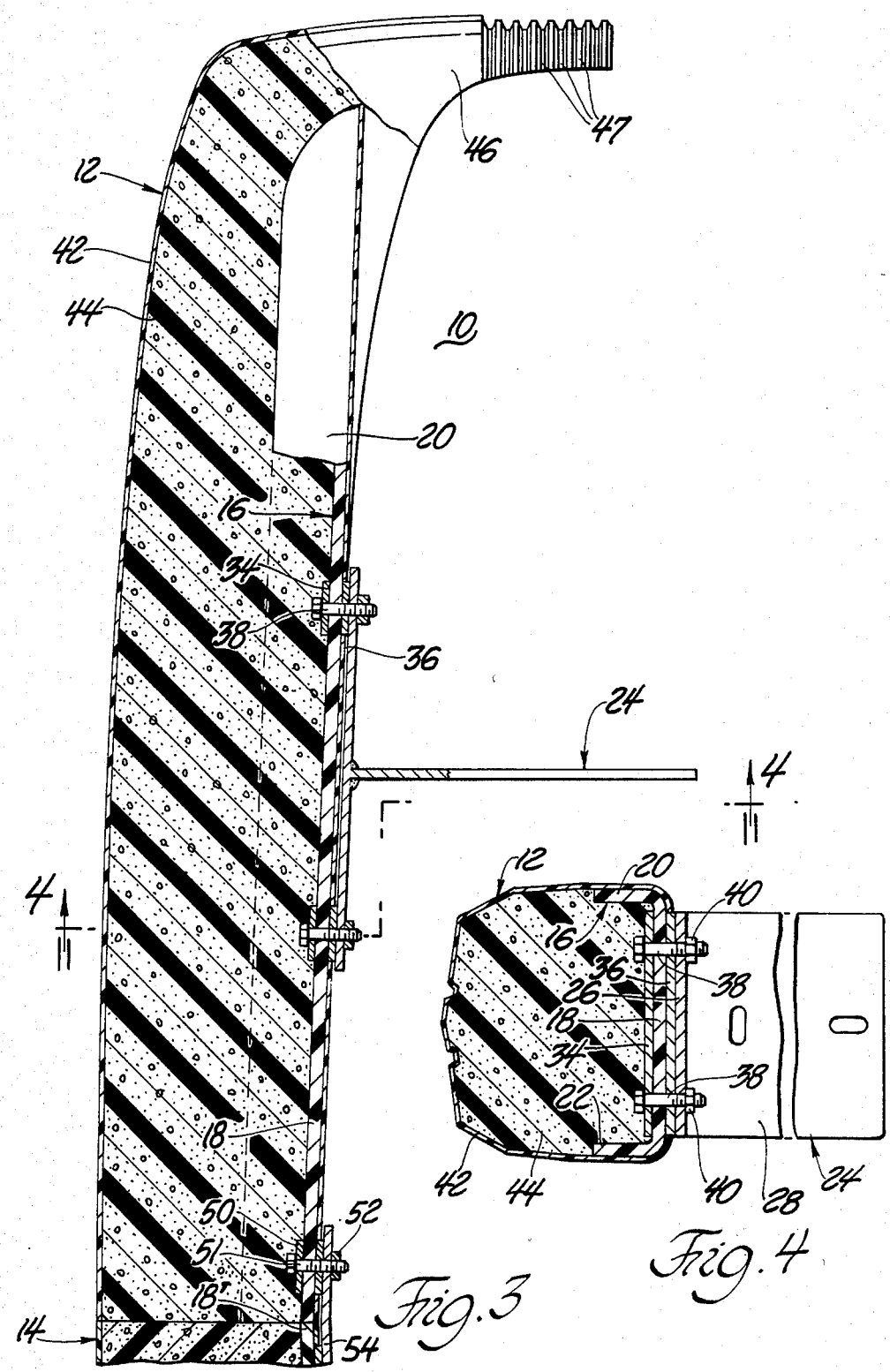

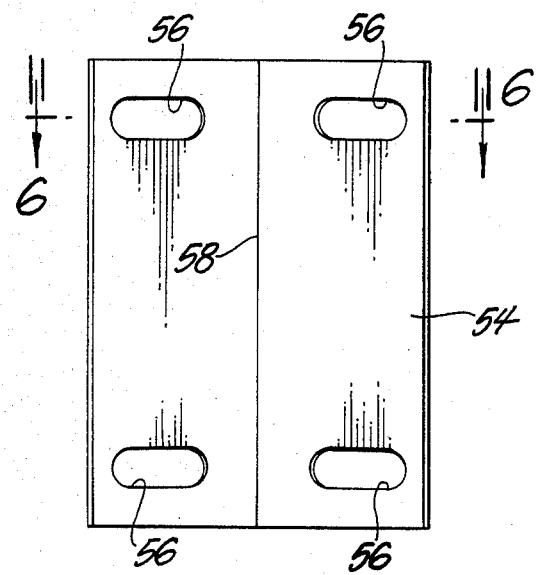
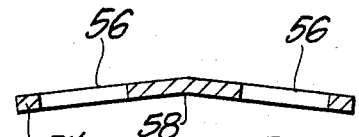
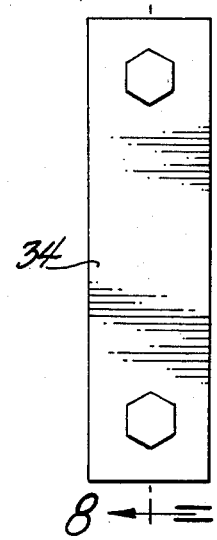
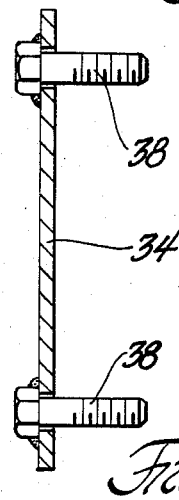
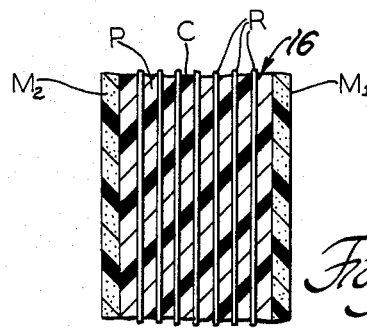
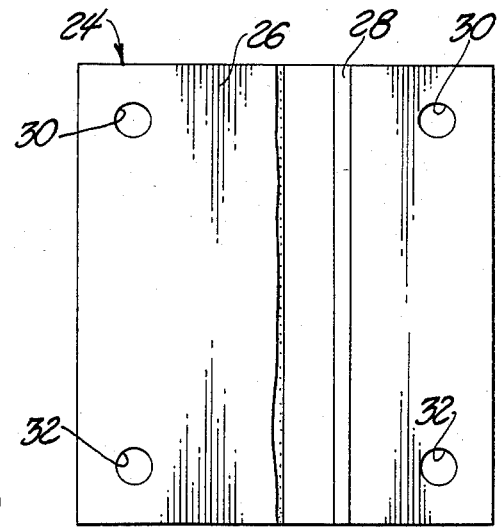

ENERGY ABSORBING VEHICLE BUMPER

TECHNICAL FIELD

The subject matter of the present invention is an energy absorbing vehicle bumper of a type useful with heavy duty vehicles and particularly on buses. The bumper system of the present invention is generally of the type wherein a relatively soft and resilient material is mounted in front of and upon a relatively stiff, though deflectable, transverse support beam member which is, in turn, adapted to be secured to a vehicle frame through a suitable rearwardly extending bracket structure.

Today most bus bumper systems are designed to withstand essentially the same type of collision requirements under conditions which will prevent damage to the bus or vehicle as well as to the bumper system. However, the specific manner in which such bumper systems have been constructed varies considerably one from the other and, in general, have resulted in complicated, costly, and in many cases, relatively heavy systems.

It is the purpose of the present invention to provide a greatly simplified bumper system and one which is significantly lighter than systems able to withstand comparable collision impact forces.

While the bumper system of the present invention is greatly simplified and of considerably reduced weight, it is intended to meet the following typical performance standards for a front or rear mounted bus bumper: (1) it shall withstand permanent damage and bumper component deterioration when impacted repeatedly into a fixed, full-height barrier at not less than 5 m.p.h.; (2) it shall be capable of withstanding a 5 m.p.h. impact into a fixed, full-height barrier without damage to the bus or to the energy absorbing bumper system; (3) the bumper system shall be capable of withstanding a 10 m.p.h. head-on impact by a 4,000 lb. post-1973 U.S. type passenger car without damage to the stopped bus, the energy absorbing bumper system or the car; (4) the bumper system shall be capable of withstanding an 8 m.p.h. impact by a 4,000 lb. post-1973 U.S. type passenger car at a 30° angle with no damage to the bus; and (5) the front bumper shall be capable of withstanding a 25 m.p.h. impact by the bus into the rear of a 4,000 lb. post-1973 U.S. type passenger car without damage to the bus structure or to the energy absorbing bumper.

BACKGROUND ART

While heavy duty bumper systems have been built which are capable of meeting the above noted collision impact requirements, they have normally been relatively complicated of design and therefore costly to manufacture as well as being heavier than is to be desired.

The following patents are illustrative of bumper systems which have been designed to perform in environments similar to that of the subject invention:

U.S. Pat. No. 3,897,095 "Resilient Bumper Assembly"—Glance et al

U.S. Pat. No. 3,902,748 "Pneumatic Energy Absorbing Bumper System For Motor Vehicles"—Bank et al U.S. Pat. No. 3,989,292 "Semi-Pneumatic Energy Absorbing Bumper System For Motor Vehicles'"—Bank et al U.S. Pat. No. 4,103,951 "Semi-Pneumatic Energy Absorbing Bumper System For Motor Vehicles'"—Bank et al While not done in the manner of applicant, it is also previously known to have constructed a bus type bumper system utilizing a resilient foam material encased in elastomeric outer cover member.

DISCLOSURE OF THE INVENTION

The subject invention generally relates to an energy absorbing vehicle bumper system of the type including horizontally extending support beam means intended to span the width of the vehicle such as a bus. Bracket members are provided for mounting the bumper system to the vehicle. Energy absorbing means are mounted upon the beam on the front side thereof and opposite from the bracket members. The energy absorbing means includes a resiliently deformable material which is enclosed by an elastomeric outer cover means. The subject bumper systems include the following unique features. First, the support beam means comprises a pair of identical beam members adapted to be centrally joined at their horizontally inner ends. Each support beam has a generally U-shape cross-section which includes a vertical wall portion and a pair of short horizontal leg portions which project forwardly from the upper and lower edges of the vertical wall portion. Bolt members are supported upon each beam member such that their threaded shanks project rearwardly through aligned holes in the vertical wall portion of the beam and an associated bracket member. An elastomeric cover means is molded about and encloses each support member and the energy absorbing material such that the threaded bolt shanks project rearwardly therethrough. A resilient energy absorbing material is of a cellular foam construction, such as polyurethane, and entirely fills the volume defined by the U-shape beam and the elastomeric cover.

It is an important part of the present invention in both meeting the required collision standards as well as reducing weight and simplifying the overall design and construction of the bumper system that the support beams are formed of a composite reinforced plastic material and preferably such as made by what is known as the "pultrusion" process. As will be considered in detail below, the pultruded support beams of the present invention have been designed in such a way as to achieve the beam strength necessary to attain the desired collision resisting loads and weight objectives.

Additionally, the invention includes a uniquely simplified system for both joining the support beams as well as for mounting the bracket members to each of the support beams.

The details of the invention are set forth in the drawings and the description which follows:

BRIEF DESCRIPTION OF DRAWINGS

FIG. 3 is a horizontal section through one of the bumper modules;

FIG. 4 is a cross-sectional view along line 4—4 of FIG. 3;

FIGS. 5 and 6 are respectively plan and elevational views of the module joining plate;

FIGS. 7 and 8 are respectively plan and side elevational views of the bolt mounted bracket fastening strip plate;

FIG. 9 is a schematic representation of the cross-sectional construction of the pultruded support beam; and FIG. 10 is an end view of the bumper mounting bracket.

BEST MODE FOR CARRYING OUT THE INVENTION

Figure 1:
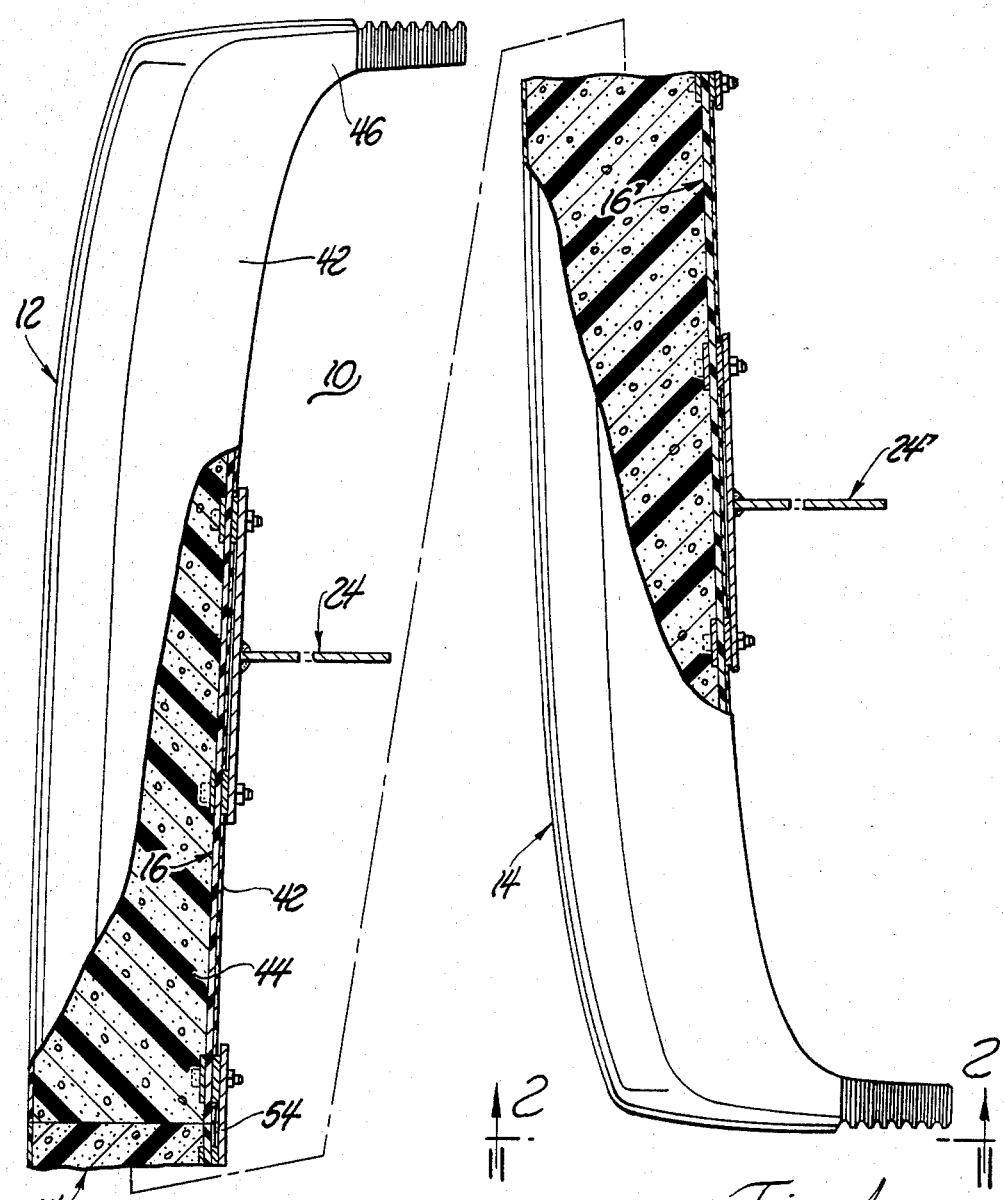
FIG. 1 is a plan view of the bumper structure.
Figure 2:
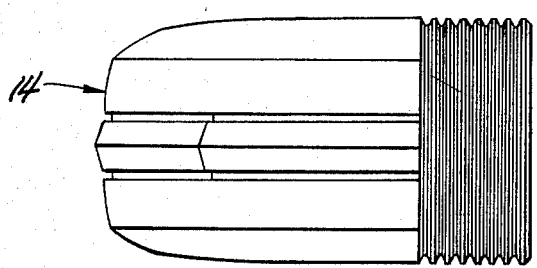
FIG. 2 is an end view along line 2—2 of FIG. 1.

While the system may be used for any heavy duty vehicle, it will hereinafter be referred to as being used with a bus. Referring particularly to FIGS. 1 through 4, the bumper system is indicated generally at 10 and is comprised of two substantially identical module portions 12 and 14 adapted to be suitably joined centrally to form an integrated bumper system adapted to span the front of a bus. Inasmuch as the bumper modules 12 and 14 are substantially identical, only module 12 will be described with the corresponding elements of module 14 being indicated with the same numbers plus a prime mark.

Each bumper module includes a U-shape support beam 16 which, as seen in FIG. 4, includes a central wall portion 18 adapted to be mounted in a vertical position and a pair of relatively short leg portions 20 and 22 adapted to project horizontally forwardly from the upper and lower ends of the vertical wall portion.

Module 12 is adapted to be mounted to the bus frame structure, not shown, through an appropriate bracket member 24. Referring to FIGS. 4 and 10, Bracket member 24 is generally of a T-shape and includes a top or forward portion 26 and a central leg portion 28. Bracket portions 26 and 28 are adapted to be mounted in a vertical position. Referring to FIG. 10, bracket portion 26 includes two sets of vertically spaced holes 30 and 32 formed therethrough and transversely spaced on either side of leg portion 28. Corresponding holes are formed through the vertical wall portion 18 of support beam 16. When bracket 24 is secured to the appropriate bus frame structure through leg portion 28, said leg portion extends rearwardly substantially parallel to the longitudinal axis of the vehicle.

As best seen in FIGS. 4, 7 and 8, a vertically disposed metal strip plate 34 has threaded bolt members 38 tack welded or otherwise fixed thereto such that a pair of the plates abut against the forward face of the support beam wall portion 18 with the threaded shanks of the bolts projecting through the aligned beam and bracket holes such that bracket member 24 may be joined to module 12 by suitable nut means 40.

It is to be understood that the bumper impact forces are transmitted through a relatively soft, energy absorbing, resilient structure, infra, to the deflectable support beam 16 and bracket 24 to the vehicle frame. Thus, a portion of the initial impact load is dissipated by the resilient, energy absorbing structure which includes an elastomeric cover member or outer skin 42 which is molded about a resilient foam core element 44 as well as about the support beam 16. Thus, elastomeric cover 42 encloses the support beam 16, the heads of bolt elements 38, and a foam core element 44. The cover is molded in such a way that the threaded shanks of bolts 38 project rearwardly so as to be exposed for threadably receiving nut members 40.

The outer skin or cover 42 is formed of any suitable elastomeric material such as neoprene, high density urethane, or the like, and must be of such a quality and thickness as to resist puncturing by the impingement of a ¼ inch spherically radiused rod thrust endwise into the bumper with a thrust of not less than 350 pounds. In the illustrated embodiment, cover skin 42 has a thickness of about 3/16 inch. A most satisfactory material is a self-skinning urethane having a density of 60 pounds per cubic foot. One such material is available from Mobay Chemical and is identified as 110-25.

Resilient foam core material 44 may be a suitable material such as polyurethane having a density in the range of 8 to 20 pounds per cubic foot. Such a material is Polyblend's PBO-46.

Resilient foam core element 44 is premolded to its desired shape prior to cover skin 42 being molded thereabout. It is also to be noted that in the process of molding skin 42 about beam 16 and foam 44, the mold is formed such that that portion of the rear face of vertical wall portion 18 of the beam is not covered by the skin material in that area where back-up strip plates 36 are abuttingly positioned against the beam when bracket retaining nuts 40 are tightened. The purpose of eliminating the elastomeric cover skin 42 in the area between strip plates 36 and beam wall 18 is to ensure the proper torquing of nuts 40.

In order to provide protection for the side of the bus in the area of the bumper, each module is molded with a trailing or cantilevered portion 46 formed at the outermost end thereof in such a way as to project rearwardly of the vehicle. It is to be noted that the rearmost section of trailing portion 46 has been corrugated as at 47 whereby the length of the trailing portion may be reduced by cutting off any unneeded portion thereof.

In order to join the bumper modules 12 and 14, suitable holes are formed through the vertical wall portions 18 and 18' of the support beams adjacent their horizontally innermost ends. Strip 50 and mounted bolts 51, identical to 34 and 38 described above, project rearwardly through the vertical wall portion holes so that their threaded shank portions may be engaged by suitable nut elements 52. A common joining plate 54, shown particularly in FIGS. 5 and 6, is provided and has suitable holes 56 formed therein corresponding generally to the beam holes and adapted to receive bolts 51 which project rearwardly to be engaged by the nut elements 52 to thereby join the modules together. Normally it is desired to mount the bumper modules 12 and 14 at an angle to each other so as to conform to the general front end shape of the bus. Accordingly, joining plate 54 is also angled about its vertical midline 58 so as to form the desired angle, e.g. 6", between the bumper modules.

PREFERRED EMBODIMENT

The ultimate objective of the subject bumper system is to achieve the lightest weight and simplest structure able to withstand the required, supra, collision impact loads in a manner to avoid damage to the system and the bus. In view of its numerous advantages, including weight and strength, as compared to other high strength materials, it is most preferred to use a fiberglass reinforced plastic material for the support beam members 16 and 16'. More specifically, such a material is preferably made by the well known "pultrusion process". Referring to the schematic representation of FIG. 9, the support beam material comprises a thermosetting resin, e.g. polyester, impregnated fiberglass laminated composite having a core element C and outer layers $M_1$ and $M_2$. Core element C consists of a plurality of linear and generally parallel roving elements R which extend along the transverse length of beam 16. Core element C comprises approximately 75% of the thickness of the beam material. The outer overlaying layers $M_1$ are of a mat or woven construction. Each of the layers $M_1$ and $M_2$ comprise approximately 12.5% of the thickness of the composite beam material. Core C and outer layers $M_1$ and $M_2$ are completely impregnated with a thermosetting resin P, supra, to provide a suitable composite matrix.

In the preferred embodiment, the overall cross-section thickness of the composite beam material is approximately 0.625 inch. Dimensionally, the vertical wall portion 18 of beam 16 is approximately 10 inches while leg portions 20 and 22 are approximately 3 inches in length.

Referring to FIG. 4, the covered foam material 44 projects about 5 inches beyond or forwardly of the horizontal leg members 20 and 22 and totally fills the volume defined by elastomeric cover 42 and beam 16. In absorbing the required impact loads, supra, a deflection of compression of four (4) inches of foam material 44 at a 33% efficiency has been assumed while the deflection for the support beam 16 is assumed to be 2.5 inches at 50% efficiency.

While the transverse length of the bumper is determined by the bus width, each module 12 and 14 is typically 48 or 51 inches in length. Likewise, the angle between the bumper modules, i.e. as viewed in FIGS. 1 and 3, is determined by the front end shape of the bus. As illustrated, each module is inclined rearwardly from its horizontal inner end at an angle of about 6°.

As illustrated, the various plates and brackets are preferably formed of ⅜ inch steel.

Exclusive of external bracketry and mounting hardware, the lightest energy absorbing bus bumpers have heretofore weighed about 160 pounds. The subject bumper weighs approximately 130 pounds or is about 25% lighter than known bus bumpers when built as depicted in the preferred embodiment.

It is apparent that other modifications of the energy absorbing bumper system may be made within the intended scope of the invention as set forth in the hereinafter appended claims.

What is claimed is:

1. An energy absorbing vehicle bumper system of the type including horizontally extending support beam means, bracket means for mounting said beams to the vehicle, and energy absorbing means supported upon said beam on the side thereof opposite from the bracket means, said energy absorbing means including a resilient member enclosed by an elastomeric outer cover means, the improvement comprising:
   A. the support beam means comprising a pair of identical beam members adapted to be joined at their horizontally inner ends to provide a bumper structure for spanning the front end of a vehicle;
   B. each beam having a generally U-shape cross-section with a vertical wall portion and a pair of horizontal leg portions projecting forwardly from the upper and lower edges of the vertical wall portion;
   C. a plurality of bolt elements supported upon each beam member and having threaded shanks projecting rearwardly through aligned holes in the vertical wall portion and the bracket means;
   D. said elastomeric cover means being molded about and enclosing each support beam and the resilient member such that the threaded bolt shanks project rearwardly beyond each beam member;
   E. each resilient member being a cellular foam material entirely filling the volume defined by the U-shape beam and the elastomeric cover;
   F. nut elements coacting with the threaded bolt shanks to mount the bracket means to each beam;
   G. a plate member disposed adjacent the rear face of each beam vertical wall portion and spanning the horizontally adjacent inner ends of said beams; and
   H. means for fastening said plate member to each support beam whereby said beams are joined and coact to provide a unitary bumper structure.

2. An energy absorbing vehicle bumper system of the type set forth in claim 1 wherein each support beam is formed of a pultruded reinforced resin composite material having a plurality of fiberglass strands aligned along the beam length.

3. An energy absorbing vehicle bumper system as set forth in claim 2 wherein the pultruded composite material comprises a core of said glass strands overlaid on each side by a fiberglass mat, said strands and mats being impregnated and encapsulated by a thermosetting resin.

4. An energy absorbing vehicle bumper system as set forth in claim 3 wherein the cross-sectional thickness of the pultruded composite material is comprised approximately of 75% glass strands and the remaining 25% of equal thicknesses of fiberglass mats.

5. An energy absorbing vehicle bumper system as set forth in claim 1 wherein the height of the vertical wall portion of the U-shape beam is at least twice the forwardly projecting dimension of each leg portion.

6. An energy absorbing vehicle bumper system as set forth in claim 1 wherein the bracket means includes a pair of bracket members, each bracket member being generally T-shaped with the top and leg of the T having generally the same vertical dimensions as the vertical portion of the U-shape beam, the top of the bracket member being mounted to said vertical portion of the beam and the bracket leg being substantially parallel to a longitudinal axis of the vehicle upon which the bumper system is mounted.

7. An energy absorbing vehicle bumper system as set forth in claim 6 wherein the bolt holes are formed in the top of each bracket member and are arranged in two rows of two holes each and with the rows being laterally spaced on opposite sides of the bracket leg.

8. An energy absorbing vehicle bumper system as set forth in claim 7 wherein each bolt element is fixed to a first strip plate disposed against the forward face of the vertical beam portion such that the threaded bolt shanks project rearwardly through aligned holes in said beam and bracket members.

9. An energy absorbing vehicle bumper system as set forth in claim 8 wherein each strip plate includes a pair of vertically spaced bolt receiving holes which correspond to the aligned holes in said beam and bracket members.

10. An energy absorbing vehicle bumper system as set forth in claim 9 which includes a second strip plate corresponding to said first strip plate and disposed against the rear face of the vertical beam portion in alignment with the first plate, said second strip plate being disposed between the beam and bracket members and abutting directly against the rear face of the vertical beam portion.

11. An energy absorbing vehicle bumper system as set forth in claim 1 wherein the plate member is angled about a central vertical axis whereby a corresponding angle is imparted to the joined support beams.

12. An energy absorbing vehicle bumper system as set forth in claim 1 wherein the laterally outermost end of each molded elastomeric cover member is formed to provide a vehicle body protecting portion, said protecting portion extending outwardly and rearwardly of its associated support beam.

13. An energy absorbing vehicle bumper system as set forth in claim 1 wherein the resilient member is pre-molded and the elastomeric cover means is molded about the resilient member and support beam.

* * * * *